(12) United States Patent
Huang

(10) Patent No.: US 11,874,737 B2
(45) Date of Patent: Jan. 16, 2024

(54) DATA STORAGE DEVICE AND SELECTING BAD DATA COLUMN METHOD THEREOF

(71) Applicant: Silicon Motion, Inc., Jhubei (TW)

(72) Inventor: Sheng-Yuan Huang, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 105 days.

(21) Appl. No.: 17/715,061

(22) Filed: Apr. 7, 2022

(65) Prior Publication Data

US 2023/0137485 A1 May 4, 2023

(30) Foreign Application Priority Data

Nov. 2, 2021 (TW) .................................. 110140660

(51) Int. Cl.
*G06F 11/10* (2006.01)
*G06F 11/07* (2006.01)
*G06F 3/06* (2006.01)

(52) U.S. Cl.
CPC ........ *G06F 11/1068* (2013.01); *G06F 3/0619* (2013.01); *G06F 3/0644* (2013.01); *G06F 3/0679* (2013.01); *G06F 11/076* (2013.01); *G06F 11/0772* (2013.01)

(58) Field of Classification Search
CPC .. G06F 11/1068; G06F 3/0619; G06F 3/0644; G06F 3/0679; G06F 11/076; G06F 11/0772
See application file for complete search history.

(56) References Cited

U.S. PATENT DOCUMENTS

| | | | | |
|---|---|---|---|---|
| 11,461,025 B2 * | 10/2022 | Hung | ................... | G06F 11/1048 |
| 2015/0067443 A1 * | 3/2015 | Bao | ........................ | G06F 3/0647 |
| | | | | 714/764 |
| 2017/0147209 A1 * | 5/2017 | Lee | .......................... | G11C 29/52 |
| 2019/0042356 A1 * | 2/2019 | Chen | ....................... | G11C 16/26 |

FOREIGN PATENT DOCUMENTS

CN 112035055 * 12/2020 ............... G06F 3/06

* cited by examiner

*Primary Examiner* — Guy J Lamarre

(57) ABSTRACT

A selecting bad data column method suitable for a data storage device is provided. The data storage device includes a control unit and a data storage medium. The selecting method performed by the control unit includes: reading written data of each data column as read data; comparing the read data and the written data of each data column to calculate an average number of error bits of each data column; determining whether the average number of error bits of each data column is greater than or equal to a predetermined value; and recording a data column as a bad data column when the average number of error bits of the data column is greater than or equal to the predetermined value. In this way, in order to avoid the problems that the error correction code can't be corrected or the correction capability is excessively consumed.

8 Claims, 3 Drawing Sheets

DATA STORAGE DEVICE AND SELECTING BAD DATA COLUMN METHOD THEREOF

FIELD OF THE INVENTION

The present invention relates to an access technique for a data storage device, and more particularly to a selecting bad data column method for the data storage device.

BACKGROUND OF THE INVENTION

Downgrade Flash all exists numerous bad data columns. When the bad data columns are not detected and removed, it will consume most error correction ability (such as, a number of correctable bits) of the error correction code of the data storage device, even may exceed error correction ability of error correction code, which will result in the storage capacity of the data storage device being reduced when a fireware is installed into the data storage device, and it is easy to cause the reading and writing failure of the data storage device. However, if the condition for judging that the bad data columns of the data storage device is too strictly, the number of bad data columns in the data storage device is too few and may exceed error correction ability of the error correction code. If the condition for judging that the bad data columns of the data storage device is too loose, the number of bad data columns in the data storage device is too many and the error correction ability of error correction code will be reduced greatly. Thus, it needs a balanceable selecting method for the bad data columns.

SUMMARY OF THE INVENTION

The present invention provides a data storage device and a selecting bad data column method thereof, which adjusts appropriately the judgement condition for the bad data column according to the maximum number of error bits supported by the error correction code of the data storage device, for avoiding the judgment condition being too strictly or too loose, and causing the error correction ability of the error correction code being exceeded or the error correction ability of the error correction code being reduced greatly.

The present invention provides a selecting bad data column method, applied to a data storage device, wherein the data storage device comprises a control unit and a data storage medium, and the data storage medium comprises a plurality of data columns. The control unit is configured to execute the selecting bad data column method comprising: reading written data of each data column as read data; comparing the read data and the written data of each data column to calculate an average number of error bits of each data column; determining whether the average number of error bits of each data column is greater than or equal to a predetermined value; and recording a data column as a bad data column when the average number of error bits of the data column is greater than or equal to the predetermined value; wherein, the predetermined value is an average number of error bits that can be corrected by an error correction code of the data storage device.

The present invention provides a data storage device comprises a data storage medium and a control unit connected to the data storage medium. The data storage medium comprises a plurality of data columns. The control unit is configured to execute a selecting bad data column method. The selecting method comprising: reading written data of each data column as read data; comparing the read data and the written data of each data column to calculate an average number of error bits of each data column; determining whether the average number of error bits of each data column is greater than or equal to a predetermined value; and recording a data column as a bad data column when the average number of error bits of the data column is greater than or equal to the predetermined value; wherein, the predetermined value is an average number of error bits that can be corrected by an error correction code of the data storage device.

In one embodiment of the present invention, the data storage medium comprises a plurality of data blocks, each data block comprises a plurality of data pages, each data page comprises a plurality of data columns which are in the same row, and the plurality of data columns are divided into a plurality of chunks.

In one embodiment of the present invention, each of the plurality of data pages comprises a data area and a spare area, and the plurality of chunks are in the data area.

In one embodiment of the present invention, each of the plurality of chunks comprises a data area and a spare area.

The present invention provides a data storage device and a selecting bad data column method thereof, which adjusts appropriately the judgement condition for the bad data column according to the maximum number of error bits supported by the error correction code of the data storage device, so as to avoid the error correction ability of the error correction code being exceeded or the error correction ability of the error correction code being reduced greatly.

In order to make the above and other objects, features, and advantages of the present invention more comprehensible, embodiments are described below in detail with reference to the accompanying drawings, as follows.

DETAILED DESCRIPTION OF PREFERRED EMBODIMENTS

Figure 1:
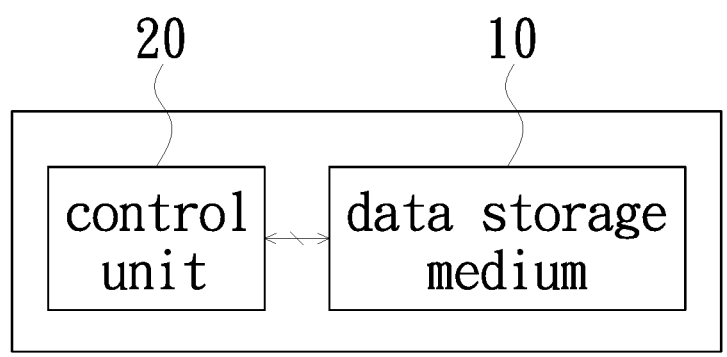
FIG. 1 is a schematic diagram of a data storage device provided by an embodiment of the present invention.

As shown in FIG. 1, FIG. 1 is a schematic diagram of a data storage device provided by an embodiment of the present invention. The data storage device 1 comprises a data storage medium 10 and a control unit 20, and the control unit 20 is connected to the data storage medium 10, in order to access data in the data storage medium 10.

Figure 2:
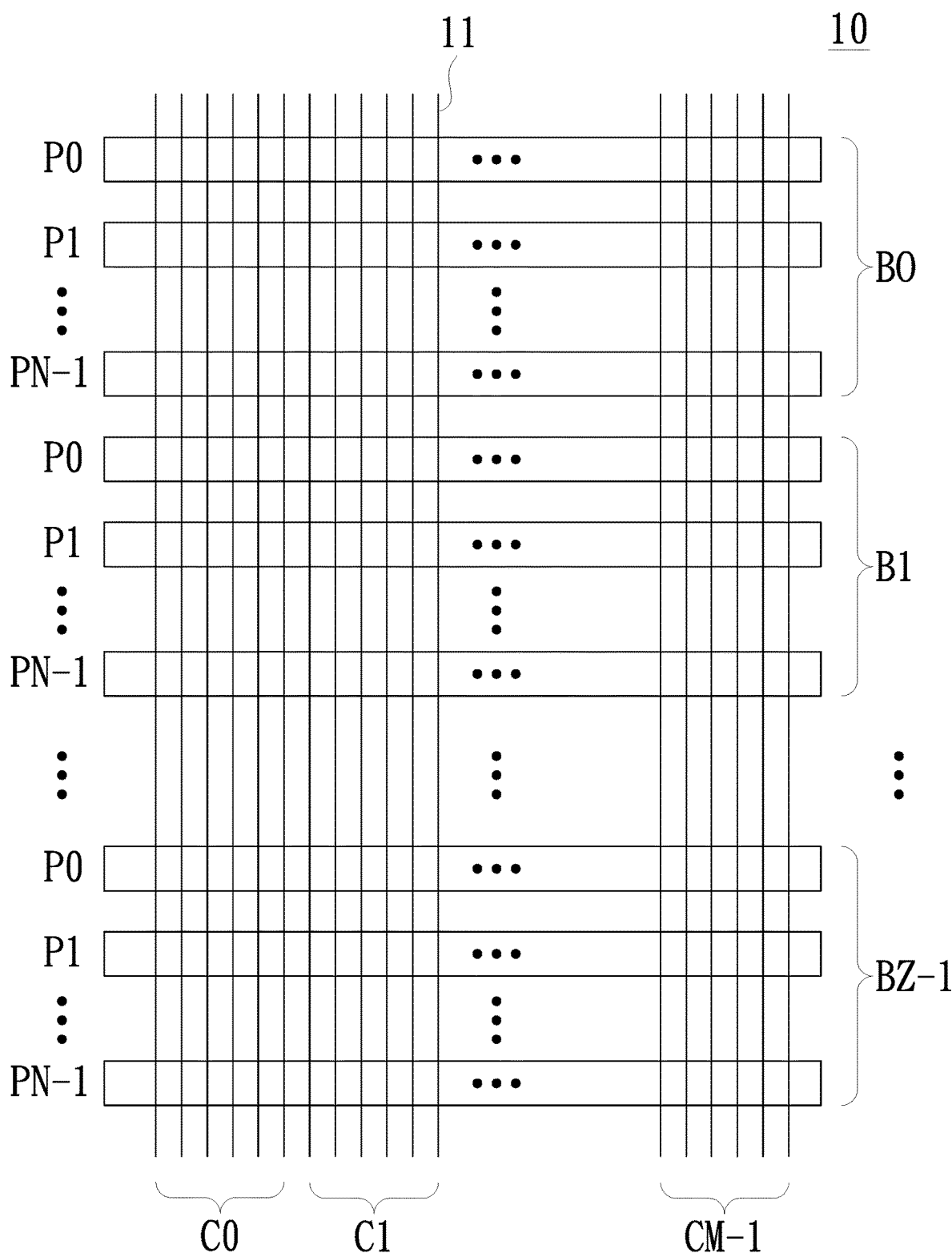
FIG. 2 is a schematic diagram of a data storage medium provided by an embodiment of the present invention.

As shown in FIG. 2, FIG. 2 is a schematic diagram of a data storage medium provided by an embodiment of the present invention. The data storage medium 10 comprises a plurality of data blocks (as shown in labels B0 to BZ-1). Each data block comprises a plurality of data columns 11, and the data columns placed in the same row is called a data page (as shown in the labels P0 to PZ-1). Further, according to the demand of a user, the data columns 11 are divided into M chunks (as shown in the labels C0 to CM-1), and each chunk C0 to CM-1 comprises a plurality of data columns 11. Z, N, and M in the above are all positive integers. In this embodiment, data storage medium 10 is realized by non-volatile memory, for example, by a memory device with long-term data storage such as Flash memory, Magnetoresistive RAM, Ferroelectric RAM, etc. Moreover, in an embodiment, each data page can be divided into a data area and a spare area, and the M chunks are in the data area. In the other embodiment, each chunk C0 to CM-1 can be divided into a data area and a spare area. The data area is configured to store data (or user data), the spare area is configured to store parity codes, and the parity codes are configured to correct error bits of data in the data area.

Since the bad data column exists in the data storage medium 10, before the data storage medium 10 is divided into the data area and the spare area, the selecting method for bad data columns of the present invention can be used to effectively determine and record the bad data columns of the data storage medium 10. After the locations of the bad data columns are determined, then the data area and the spare area are divided. In addition, the division of the data area and the spare area are based on the logical division of data management, therefore, the user can also divide the data area and the spare area in the beginning, and then use the selecting method for bad data columns of the present invention in order to determine and record the locations of the bad data columns, and finally, adjust the division of the data area and the spare area. The spirits of the above two data division methods are similar, and the order of execution steps is slightly different, in order to simplify the description of the present invention, only the second embodiment is used for description, but it is not limited thereto.

Figure 3:
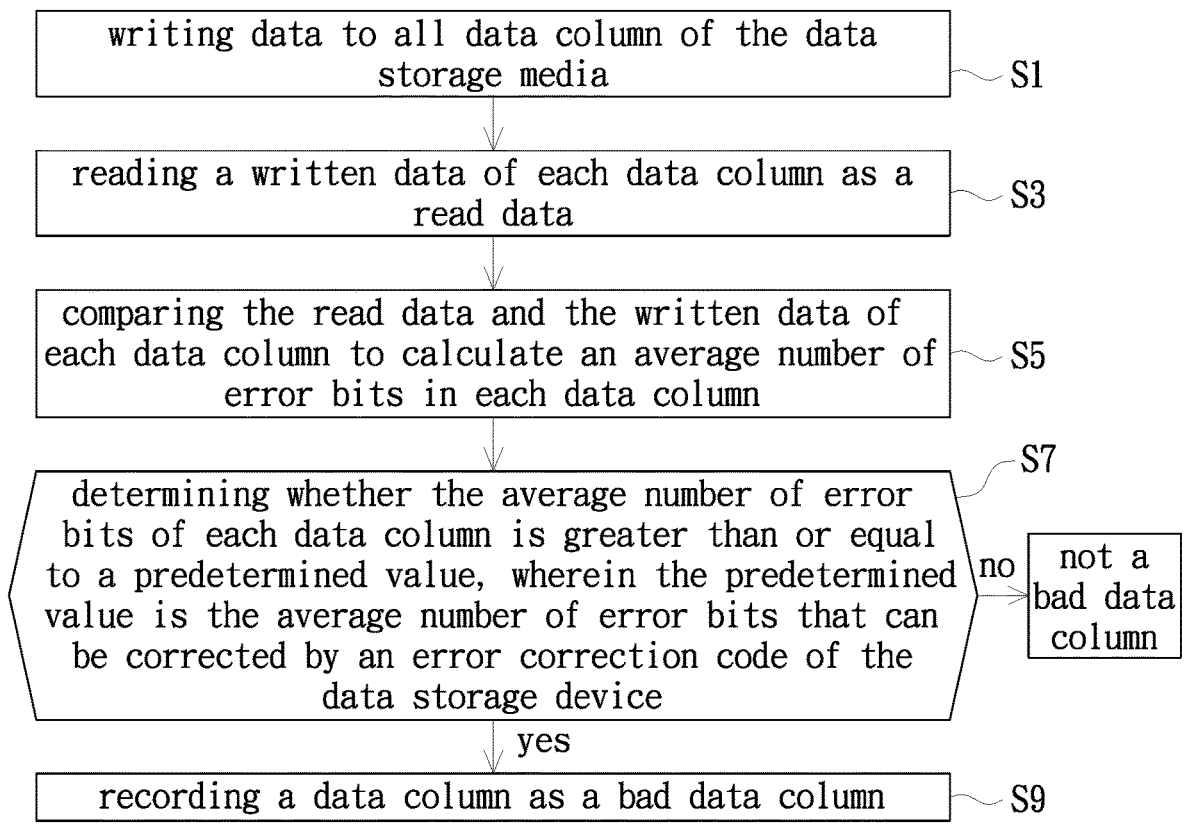
FIG. 3 is a flowchart schematic diagram of a selecting bad data column method for a data storage device provided by an embodiment of the present invention.

As shown in FIG. 3, FIG. 3 is a flowchart schematic diagram of a selecting bad data column method for a data storage device provided by an embodiment of the present invention. The control unit 20 executes the selecting method for bad data column of the present invention including the following steps. In step S1, the control unit 20 writes data to all data columns 11 of the data storage medium 10. In step S3, the control unit 20 reads written data of each data column 11 as read data. In step S5, the control unit 20 compares the read data and the written data of each data column 11 to calculate an average number of error bits in each data column 11. In step S7, the control unit 20 determines whether the average number of error bits of each data column is greater than or equal to a predetermined value, wherein the predetermined value is the average number of error bits that can be corrected by an error correction code of the data storage device 1. In step S9, the control unit 20 records a data column 11 as a bad data column when the average number of error bits of the data column 11 is greater than or equal to the predetermined value.

It can be noted that the capacity of the spare area in the data storage medium 10 determines the error correction ability of error correction code. That is, when the spare area in the data storage medium 10 is smaller, the error correction ability of error correction code is lower, such as the number of correctable error bits that will decrease accordingly; when the spare area in the data storage medium 10 is larger, the error correction ability of error correction code is greater, such as the number of correctable error bits that will increase accordingly.

In an embodiment, the data storage medium 10 includes 17,472 data columns 11, each data column includes 2,560 bits, these data columns are divided into sixteen chunks, each chunk includes 1,024 data columns 11, and the spare area includes 17,472−(16*1,024)=1,088 data columns 11. That is, each chunk can be allocated to sixty eight data columns 11, so that the error correction code corresponding to the data columns 11 of the spare area provides the ability of 36-bit correction capacity for correcting error, and the allowable average number of error bits per data column 11 is 36/(1,024+68)=0.032 bits, which is the predetermined value. Wherein, the numerical value in this embodiment will change as the capacity of the data storage medium 10, and the present invention is not limited to the above numerical value.

In this embodiment, the control unit 20 writes data to all data columns 11 of the data storage medium 10, reads written data of each data column 11 as read data, compares the read data and the written data of each data column 11 to calculate the average number of error bits in each data column 11, and determines whether the average number of error bits in each data column 11 is greater than or equal to the predetermined value.

When the number of error bits of a data column 11 is 100 bits, the control unit 20 calculates the average number of error bits of the data column 11 as 100/2,560=0.039 bits. When the control unit 20 determines that the average number of error bits (0.039 bits) of the data columns 11 is greater than the predetermined value (0.032 bits), the control unit 20 records the data columns 11 as a bad data column in a bad data column table of the data storage device 1.

When the number of error bits of a data column 11 is 70 bits, the control unit 20 calculates the average number of error bits of the data column 11 as 70/2,560=0.027 bits. When the control unit 20 determines that the average number of error bits (0.027 bits) of the data columns 11 is less than the predetermined value (0.032 bits), it indicates that the data columns 11 is not the bad data column.

It should be noted that the above embodiments are not intended to limit the present invention, the ordinary skilled in the art can divide different number of chunks according to the capacity of the data storage medium 10 and the number of data columns 11, and adjust the capacity of the data area and the spare area, thereby appropriately finding the error correction ability of the error correction code of the data storage device 1.

In summary, the present invention provides a data storage device and a selecting bad data block method thereof, which adjusts appropriately the judgement condition for the bad data column according to the maximum number of error bits supported by the error correction code of the data storage device, so as to avoid the error correction ability of the error correction code being exceeded or the error correction ability of the error correction code being reduced greatly.

Although the present invention has been disclosed as above with the embodiments, it is not intended to limit the present invention. The ordinary skilled in the art may make some modifications and retouching without departing from the spirit and scope of the present invention. Therefore, the protection scope of the present invention shall be determined by the scope of the attached claims.

What is claimed is:

1. A selecting bad data column method, applied to a data storage device, wherein the data storage device comprises a control unit and a data storage medium, and the data storage medium comprises a plurality of data columns, and the control unit executes the selecting bad data column method comprising:
   reading written data of each data column as read data;
   comparing the read data and the written data of each data column to calculate an average number of error bits of each data column;
   determining whether the average number of error bits of each data column is greater than or equal to a predetermined value; and recording a data column as a bad data column when the average number of error bits of the data column is greater than or equal to the predetermined value;

wherein, the predetermined value is an average number of error bits that can be corrected by an error correction code of the data storage device.

2. The selecting bad data column method as claimed in claim 1, wherein the data storage medium comprises a plurality of data blocks, each of the plurality of data blocks comprises a plurality of data pages, and each of the plurality of data pages comprises a plurality of data columns which are in the same row, and the plurality of data columns are divided into a plurality of chunks.

3. The selecting bad data column method as claimed in claim 2, wherein each of the plurality of data pages comprises a data area and a spare area, and the plurality of chunks are in the data area.

4. The selecting bad data column method as claimed in claim 2, wherein each of the plurality of chunks comprises a data area and a spare area.

5. A data storage device comprising:
a data storage medium, comprising a plurality of data columns; and
a control unit, connected to the data storage medium, and configured to execute a selecting bad data column method, the selecting method including:
reading written data of each data column as read data;
comparing the read data and the written data of each data column to calculate an average number of error bits of each data column;
determining whether the average number of error bits of each data column is greater than or equal to a predetermined value; and
recording a data column as a bad data column when the average number of error bits of the data column is greater than or equal to the predetermined value;
wherein, the predetermined value is an average number of error bits that can be corrected by an error correction code of the data storage device.

6. The data storage device as claimed in claim 5, wherein the data storage medium comprises a plurality of data blocks, each of the plurality of data blocks comprises a plurality of data pages, and each of the plurality of data pages comprises a plurality of data columns which are in the same row, and the plurality of data columns are divided into a plurality of chunks.

7. The data storage device as claimed in claim 6, wherein each of the plurality of data pages comprises a data area and a spare area, and the plurality of chunks are in the data area.

8. The data storage device as claimed in claim 6, wherein each of the plurality of chunks comprises a data area and a spare area.

* * * * *